United States Patent [19]
Lavene

[11] Patent Number: 4,719,539
[45] Date of Patent: Jan. 12, 1988

[54] HERMETICALLY SEALED CAPACITOR

[75] Inventor: Bernard Lavene, Ocean, N.J.

[73] Assignee: Electronic Concepts, Eatontown, N.J.

[21] Appl. No.: 773,643

[22] Filed: Sep. 6, 1985

[51] Int. Cl.$^4$ .................... H01G 1/14; H01G 7/00
[52] U.S. Cl. .................................. 361/307; 29/25.42
[58] Field of Search ............... 361/301, 306, 307, 323, 361/324, 273, 433 W; 29/25.42

[56] References Cited

U.S. PATENT DOCUMENTS

| | | | |
|---|---|---|---|
| 1,599,853 | 9/1926 | Toelle | 361/307 |
| 2,769,944 | 11/1956 | Stein et al. | 361/307 |
| 3,102,216 | 8/1963 | McGraw | 361/323 X |
| 3,229,174 | 1/1966 | Marchewka | 361/307 |
| 3,513,369 | 5/1970 | England et al. | 361/323 X |

FOREIGN PATENT DOCUMENTS 801269 5/1936 France ................... 361/307
899322 8/1944 France ................... 361/433 W

*Primary Examiner*—Donald A. Griffin
*Attorney, Agent, or Firm*—Ratner & Prestia

[57] ABSTRACT

A wound capacitor having high current carrying capacity in which a capacitor winding is wrapped around a core assembly having high thermal conductivity. The core assembly transfers thermal energy from the interior of the capacitor to the exterior. The ends of the core assembly extend outwardly beyond the terminals for radiating heat to the exterior of the capacitor thereby increasing the current carrying capacity of the capacitor. The core assembly includes separated metal portions secured to an electrically nonconductive portion. Cover seals may be positioned over the ends of the core assembly in contact with the terminals. The capacitor may be hermetically sealed. The metal portions and the electrically nonconductive portion may be hollow tubes forming a passageway through the entire length through the core assembly.

26 Claims, 12 Drawing Figures

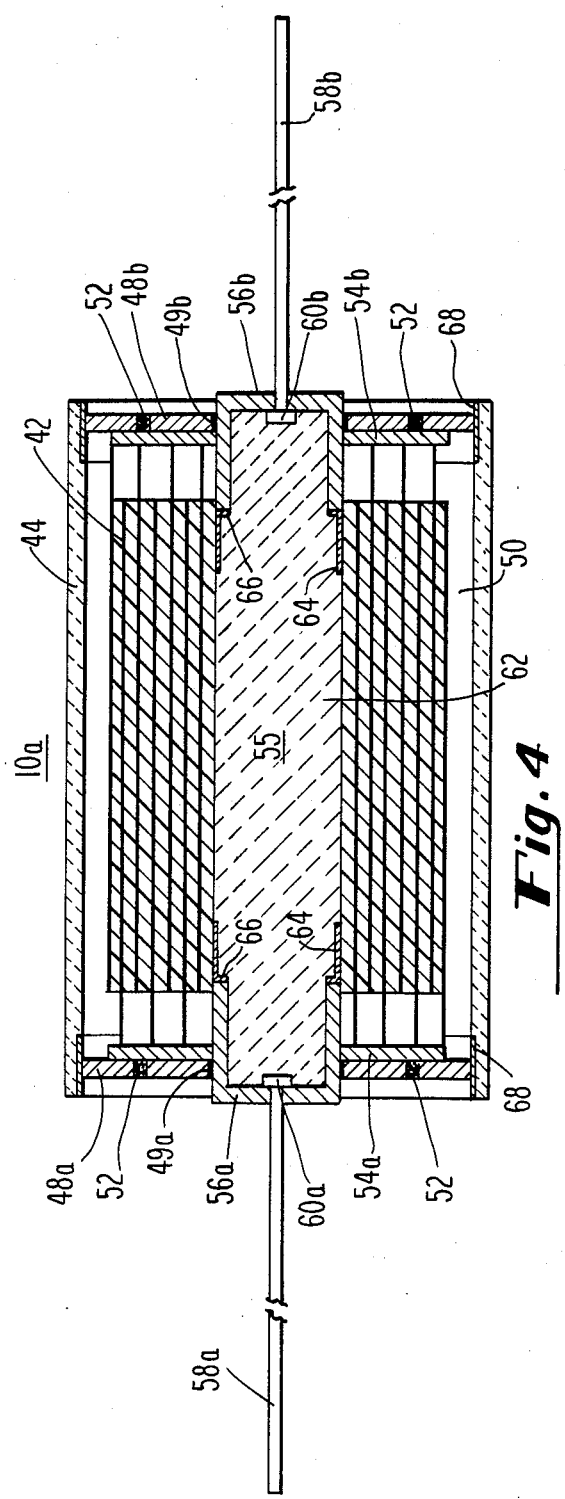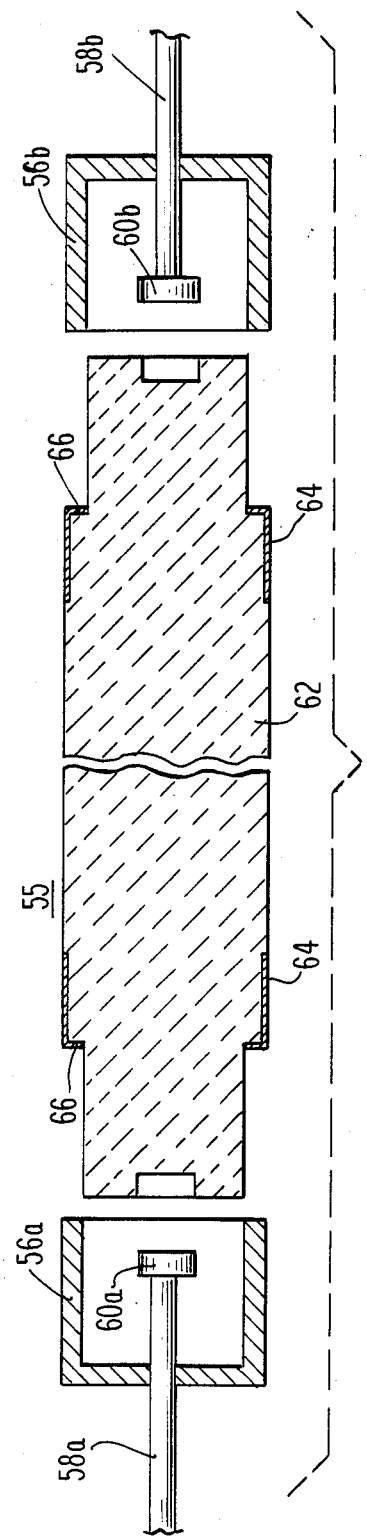

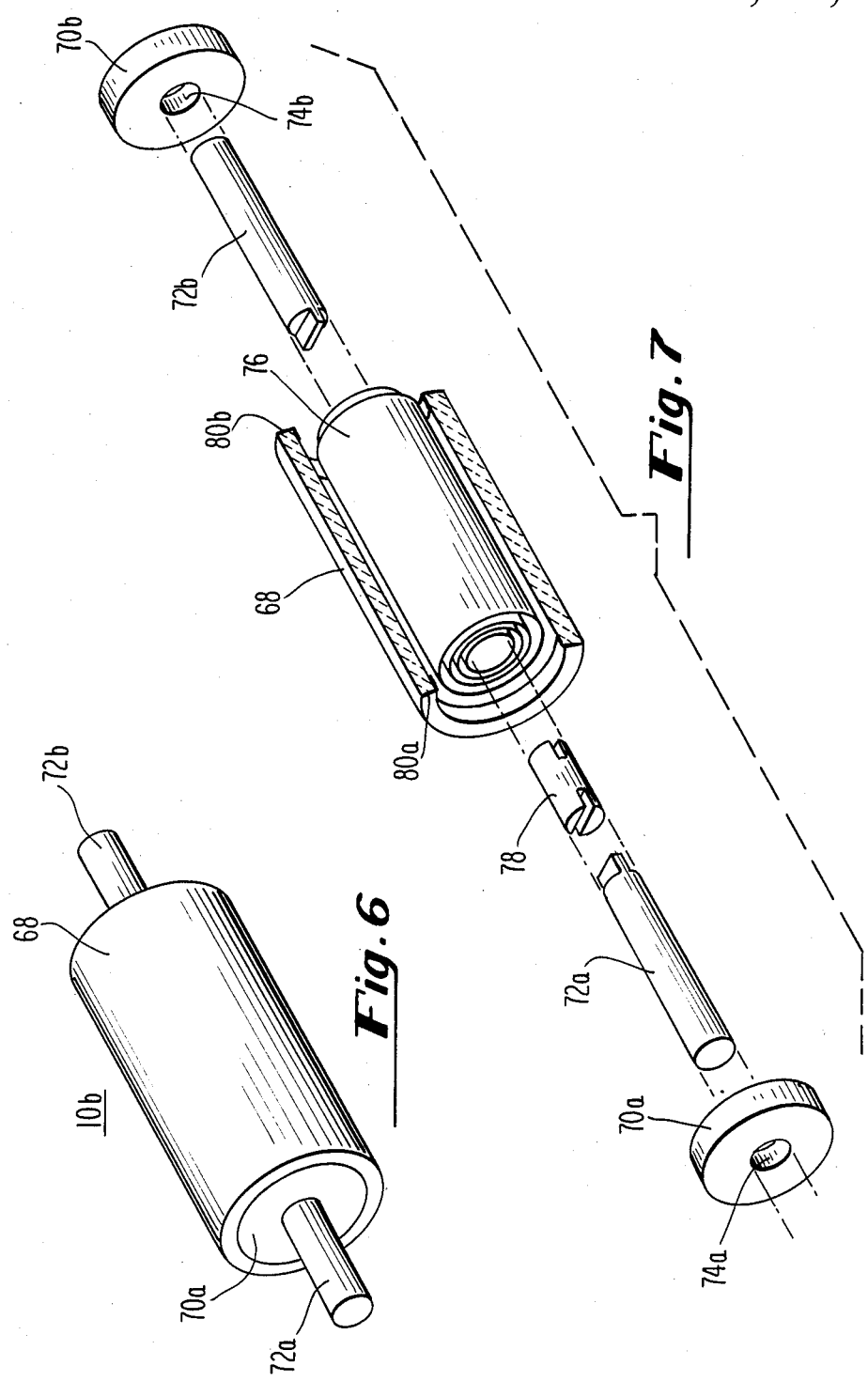

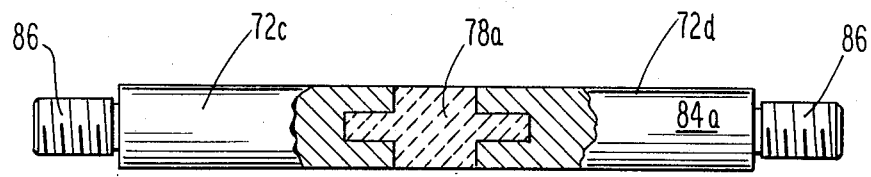
_Fig. 10A_
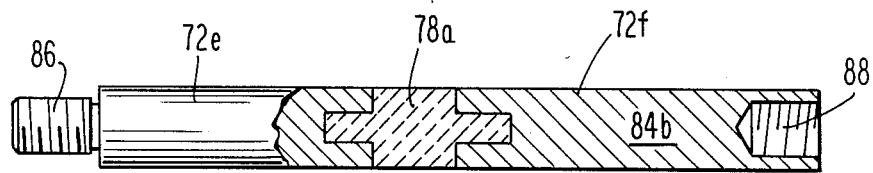
_Fig. 10B_
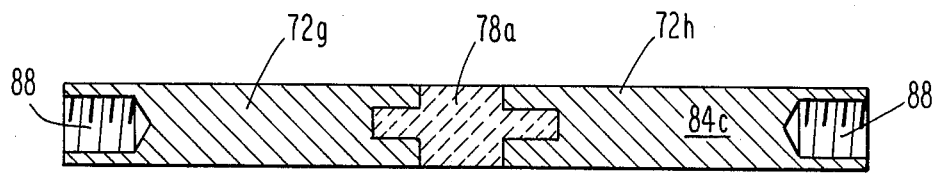
_Fig. 10C_

HERMETICALLY SEALED CAPACITOR

BACKGROUND OF THE INVENTION

1. Field of the Invention

This invention relates to the field of wound capacitors and in particular to capacitors having high thermal energy transfer.

2. Prior Art

It is known to form capacitors by winding layers of metallized film around a core. When electrical current is passed through the capacitor winding, thermal energy is generated. In high current applications, this thermal energy can be quite large and may lead to deterioration of the capacitor. This problem is especially severe for small capacitors in which the thermal energy is concentrated in a small volume.

Additionally, this problem may be increased if the capacitor is hermetically sealed because the hermetic sealing may make it more difficult for the heat to be transferred to the exterior of the capacitor and to dissipate. It is known to place metal cover seals at the opposite ends of hermetically sealed capacitors thereby increasing somewhat the transfer of thermal energy to the exterior of the capacitor. It is further known to provide perforations in these cover seals. The perforations also facilitate the manufacture of these capacitors by permitting outgassing to occur when the capacitor is baked prior to sealing to clean and dry the capacitor. These perforations are adapted to receive solder during subsequent manufacturing steps.

SUMMARY OF THE INVENTION

A wound capacitor having high current carrying capacity in which a capacitor winding is wrapped around a core assembly having high thermal conductivity and extending the entire length of the capacitor. Electrodes are formed at opposite ends of the capacitor winding, and the core assembly and winding are inserted into a sleeve. The ends of the core assembly extend outwardly beyond the terminals for radiating to the exterior of the winding heat produced by passing current through the capacitor winding thereby increasing the current carrying capacity of the capacitor.

BRIEF DESCRIPTION OF THE FIGURES

FIG. 4 shows an alternate embodiment of the capacitor of FIG. 1.

FIG. 5 shows an expanded view of the core assembly of the capacitor of FIG. 4.

FIG. 6 shows an additional alternate embodiment of the capacitor of FIG. 1.

FIG. 7 shows an exploded view of the capacitor of FIG. 6.

FIGS. 10A-C show alternate embodiments of the core assembly of FIG. 8.

DETAILED DESCRIPTION OF THE INVENTION

Figure 1:
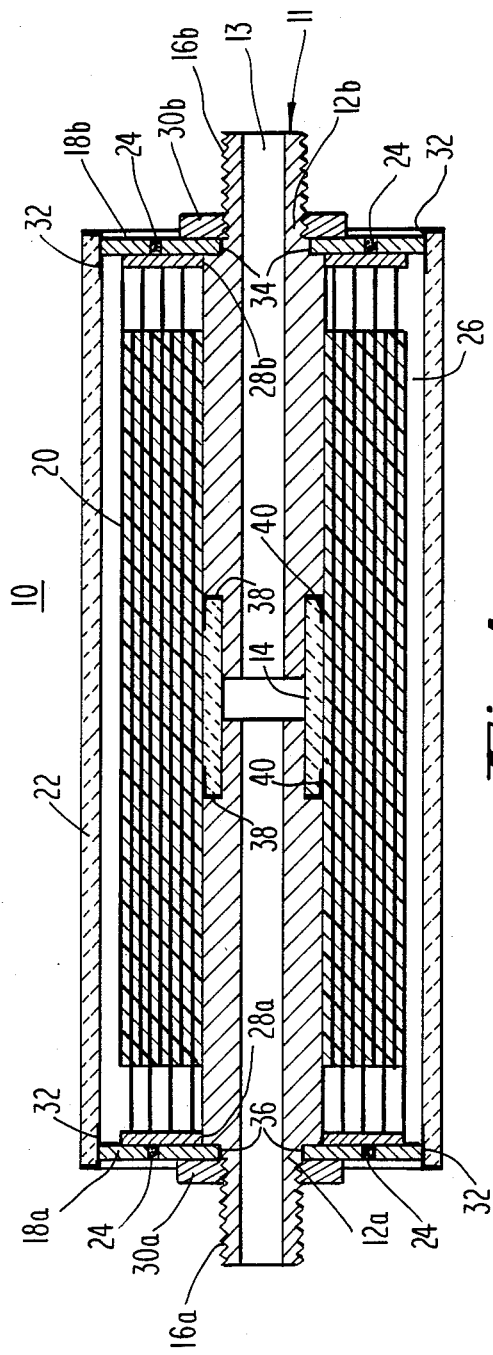
FIG. 1 is a cross-sectional view of the wound capacitor of the present invention.
Figure 2:
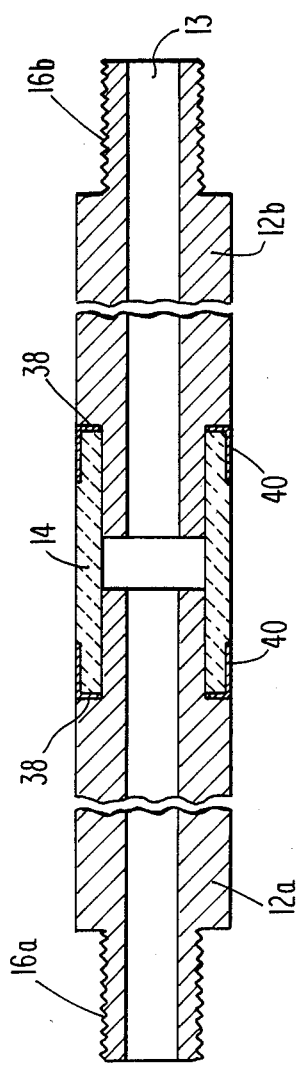
FIG. 2 shows the core assembly of the capacitor of FIG. 1.

Referring now to FIGS. 1, 2, there is shown the high current hermetically sealed capacitor 10 of the present invention. Capacitor 10 includes hollow core assembly 11 surrounded by capacitor winding 20 whereby thermal energy produced within winding 20 by current passing through winding 20 is transmitted to core assembly 11 which extends beyond the ends of winding 20 and dissipates thermal energy from winding 20. At opposite ends of capacitor winding 20 are electrodes 28a,b. Capacitor winding 20, electrodes 28a,b, and cover seals a,b are enclosed in ceramic sleeve 22. The ends of capacitor 10 are sealed by cover seals 18a,b which may be hermetically sealed to sleeve 22 and core assembly 11.

Core assembly 11 includes hollow metal tubes 12a,b which may be any metal other than iron for good ESR because eddy currents develop in iron causing an increase in resistance. For example, metal tubes 12a,b may be brass or copper. Metal tubes 12a,b are joined to opposite ends of hollow ceramic tube 14 to electrically insulate metal tubes 12a,b from each other and thermally couple metal tubes 12a,b to each other while forming a continuous passageway 13 through the entire length of core assembly 11. Air may pass through passageway 13 thereby cooling capacitor 10 and further increase the current carrying capacity of capacitor 10. In an example, the diameter of passageway 13 may be approximately one-eighth inch.

When electrical current is passed through winding 20, thermal energy is generated raising the temperature of capacitor 10. The hottest region of capacitor 10 is its geometric center, the region in which ceramic tube 14 is positioned. Thus core assembly 11 passes directly through the region of highest temperature within capacitor 10 and conducts thermal energy from this region to the exterior of capacitor 10. This permits capacitor 10 to carry higher current without deterioration due to excessive heat. It is believed that the geometric center of capacitor 10 does not experience a temperature rise in excess of 20° C. above ambient temperature because core assembly 11 transfers thermal energy to the exterior and that capacitor 10 meets Military Specification 83421. The current which may safely be carried by capacitor 10 is on the order of amps if air is circulated through capacitor 10. Capacitor 10 with core assembly 11 may safely handle current an order of magnitude higher than a similar capacitor without such a hollow core if air is circulated through passageway 13, for example, by a fan (not shown). It is believed that if air is not circulated through passageway 13, current capacity may still improve by a factor five to ten over a similar capacitor without core assembly 11.

Figure 3:
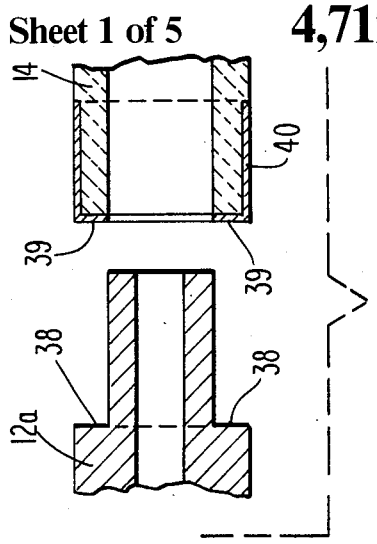
FIG. 3 is an enlarged view of a joint between portions of the core assembly of FIG. 2.

Referring now to FIG. 3, an enlarged view of the joint between metal tube 12a and ceramic tube 14 is shown. Surface 38 of metal tube 12a, perpendicular to the longitudinal direction of core assembly 11, is joined to surface 39 of metallization layer 40 of ceramic tube 14 by soldering. Metallization layer 40 of ceramic tube 14 extends inwardly along ceramic tube 14 from surface 39.

To form capacitor 10, core assembly 11 is assembled first. To assemble core assembly 11, a small amount of solder may be placed between surfaces 38,39 and the joint is heated causing metallization layer 40 on ceramic tube 14 and metal tube 12a to be hermetically sealed.

Metallization layer 40 is deposited on ceramic tube 14 in a conventional manner such as firing metal particles into the surface of ceramic tube 14. Metal tube 12b is sealed in the same manner to the end of ceramic tube 14 opposite the end to which metal tube 12a is sealed. These seals help to hermetically seal capacitor 10 and are not intended to provide strong mechanical connection. Alternately ceramic tube 14 may be press fitted to metal tubes 12a,b. In the alternate embodiment tubes 12a,b, 14 may have the configuration shown in FIGS. 1-3.

The high thermal conductivity of ceramic tube 14 and metal tubes 12a,b, which form a thermal conductor through the entire length of capacitor winding 20, allows core assembly 11 to conduct thermal energy from the hot spot at the geometric center of capacitor 10 in the interior of capacitor winding 20 and to radiate and thereby dissipate thermal energy at the ends of core assembly 11. The ends of core assembly 11 extend substantially beyond the ends of capacitor winding 20 providing increased heat sinking capability thereby cooling capacitor 10 and increasing the current carrying capacity of capacitor 10. Because metal has higher thermal conductivity than ceramic, it is preferred that metal tubes 16a,b be relatively large in comparison with ceramic tube 14 to increase thermal conduction from the interior of capacitor 10 to the exterior. However, due to cost considerations, ceramic tube 14 may be formed in a larger size.

The next step in forming capacitor 10 after core assembly 11 is formed by joining and hermetically sealing ceramic tube 14 and metal rods 12a,b, is forming capacitor winding 20 directly upon core assembly 11. Winding 20 may be formed by taping the ends of layers of conventional metallized film to core assembly 11 and turning core assembly 11. Also, friction may be relied upon to grip the metallized film after the first turn of core assembly 11. Next electrodes 28a,b at opposite ends of capacitor winding 20 are formed after the metallized film has been wound around core assembly 11. To form electrodes 28a,b the ends of capacitor winding 20 may be sprayed at high velocity with a mixture of compressed air and molten fine particles of tin produced from an electric arc gun or any other conventional method of forming electrodes may be used.

When electrodes 28a,b are formed on winding 20, cover seals 18a,b are positioned at opposite ends of capacitor 10 in flush physical contact with electrodes 28a,b. Thus every layer of winding 20 is in thermal contact with either cover seal 18a or seal 18b through its electrode 28a or electrode 28b. To force cover seals 18a,b firmly against electrodes 28a,b, metal tubes 12a,b may include threaded portions 16a,b respectively, and nuts 30a,b. The threading on threaded portion 16a,b may be ¼-20 inch. When nuts 30a,b are tightened, cover seals 18a,b are forced inward tightly against electrodes 28a,b thereby increasing heat transfer between electrodes 28a,b and seals 18a,b. The ends of sleeve 22 extend outwardly beyond the outer surfaces of cover seals 18a,b.

Because cover seals 18a,b are held tightly against the entire outer surface areas of electrodes 28a,b cover seals 18a,b may absorb thermal energy from capacitor winding 20 and transmit the absorbed thermal energy to the exterior of capacitor 10. Additionally, cover seals 18a,b may transmit the thermal energy absorbed from capacitor winding 20 to metal tubes 12a,b. Metal tubes 12a,b may also conduct thermal energy through connecting leads (not shown) to a printed circuit board (not shown) to further dissipate thermal energy. Because metal tubes 12a,b extend outwardly beyond cover seals 18a,b and electrodes 28a,b, metal tubes 12a,b may radiate and thereby dissipate the thermal energy absorbed by cover seals 18a,b from capacitor winding 20 through electrodes 28a,b.

Alternately, covers seals 18a,b may be omitted to save cost. If cover seals 18a,b are omitted, the capacitor element formed by core assembly 11 and winding 20 with terminals 28a,b is inserted into sleeve 22 and sealed with epoxy. Such an alternate embodiment would still have an increased current carrying capacity because core assembly 11 still passes through the hot spot at the geometric center of capacitor 10 and conducts thermal energy to the exterior of capacitor 10.

In addition to having an opening in the center to accommodate the outwardly extending portions of metal tubes 12a,b cover seals 18a,b have a plurality of perforations 24. Perforations 24 are adapted to receive solder beads which are placed in perforations 24 after cover seals 18a,b are positioned against electrodes 28a,b. The solder beads are then heated to achieve good electrical contact between cover seals 18a,b and electrodes 28a,b. The solder placed in perforations 24 flows between cover seals 18a,b and electrodes 28a,b increasing thermal conductivity as well as electrical conductivity between them. The soldering of cover seals 18a,b to electrodes 28a,b may be performed while nuts 30a,b are tightened to press cover seals 18a,b tightly against electrodes 28a,b. Perforations 24 may be approximately one-thirty second to one-eighth inch in diameter.

The assembly formed thus far, consisting of core assembly 11, capacitor winding 20 having electrodes 28a,b at opposite ends and cover seals 18a,b soldered to electrodes 28a,b and secured by nuts 30a,b, is then inserted into ceramic sleeve 22. Space 26 between the outer surface of capacitor winding 20 and the inner surface of sleeve 22 may be filled with a material having high thermal conductivity such as ceramic. Cover seals 18a,b may then be hermetically sealed to ceramic sleeve 22 and metal tubes 12a,b thereby forming terminals 12a,b. Nuts 30a,b may be backed off prior to this hermetic sealing. End caps (not shown) may be positioned to enclose the ends of core assembly 11 and sleeve 22.

Ceramic sleeve 22, at its outer ends, has metallization layers 32 which surround cover seals 18a,b. When the elements of capacitor 10 are inserted into sleeve 22, the outer circumferences of cover seals 18a,b are soldered to metallization layers 32 to hermetically seal cover seals 18a,b to sleeve 22. Additionally, surfaces 34,36 of the inner circumferences of cover seals 18a,b, which encircle portions of metal tubes 12a,b and form openings through which terminals 12a,b extend, are soldered to metal tubes 12a,b respectively, forming terminals 12a,b and hermetically sealing cover seals 18a,b to metal tubes 12a,b. Thus capacitor 10 may be entirely hermetically sealed while the center of winding 20 and electrodes 28a,b are thermally exposed. This soldering may be accomplished by positioning solder rings of corresponding diameter at the junctions between cover seals 18a,b and sleeve 22 and between cover seals 18a,b and metal tubes 12a,b and sweating the solder rings onto the junctions by heating them.

Metallization layers 32 completely surrounding the outer circumferences of cover seals 18a,b, inner circumferences 36,34 encircling portions of metal tubes 12a,b, and surfaces 38 of metal tubes 12a,b which are secured to metallization layers 40 of ceramic tube 14 may all be sealed thereby completely hermetically sealing capacitor 10 while allowing air to pass through passageway 13 and cool capacitor 10.

The dimensions of capacitor 10 may be in the range of approximately three-eighths by one-half inch to one and one-half by three inches. The capacitance range for capacitor 10 may be the range of one-tenth microfarad to fifty microfarads.

Referring now to FIG. 4, there is shown an alternate embodiment of capacitor 10. The alternate embodiment shown is capacitor 10a which includes core assembly 55 around which capacitor winding 42 is wrapped. Electrodes 54a,b are formed on opposite ends of capacitor winding 42 by conventional techniques such as high velocity spraying of compressed air and molten particles of tin as previously described. When core assembly 55 is assembled, capacitor winding 42 is wrapped around core assembly 55. Core assembly 55 thus forms a continuous thermal conductor which passes through the hot spot at the geometric center of capacitor 10a and conducts thermal energy from the geometric center of capacitor 10a to the exterior of capacitor 10a.

Electrodes 54a,b are then formed at opposite ends of winding 42 by conventional techniques, and the capacitor element formed thereby is inserted into sleeve 44. Space 50 between the outer surface of capacitor winding 42 and the inner surface of sleeve 44 may be filled with a material having high thermal conductivity such as ceramic particles.

Cover seals 48a,b may then be positioned at opposite ends of capacitor winding 42 flush with electrodes 54a,b. Cover seals 48a,b are positioned snugly against electrodes 54a,b. Solder beads are placed in perforations 52 of cover seals 48a,b and heated to form a good electrical connection between cover seals 48a,b and terminals 54a,b respectively. Alternately, cover seals 48a,b may be omitted and capacitor 10a may be sealed with epoxy.

The physical contact between electrode 54a and cover seal 48a and the physical contact between electrode 54b and cover seal 48b increases the heat transfer between electrodes 54a,b and cover seals 48a,b as previously described. Thermal energy absorbed from capacitor winding 42 is conducted to metal shells 56a,b of core assembly 55. Metal shells 56a,b, extend substantially beyond cover seals 48a,b.

Capacitor 10a may be hermetically sealed. Ceramic sleeve 44 includes metallization layers 68 at opposite ends of its inner surface. Metallization layers 68 encircle the outer circumferences of cover seals 48a,b. The outer circumferences of cover seals 48a,b may therefore be soldered to metallization layers 68 by sweating on solder rings as previously described. Surfaces 49a,b of the inner circumferences of cover seals 48a,b, which surround portions of metal shells 56a,b of core assembly 55, may be soldered to shells 56a,b thereby forming terminals 56a,b. In addition to hermetically sealing capacitor 10a, the solder joints between surfaces 49a,b of cover seals 48a,b and terminals 56a,b increase thermal conduction between cover seals 48a,b and terminals 56a,b.

Referring now to FIG. 5, there is shown an exploded view of core assembly 55. Core assembly 55 includes an electrically nonconductive rod like center portion 62 which may be formed of a material having high thermal conductivity such as ceramic. Center portion 62 is thermally conductive and capacitor winding 42 is wrapped around it, such that center portion 62 is at the geometric center of winding 42, the region of maximum heat concentration. Therefore center portion 62 absorbs thermal energy produced in capacitor winding 42 when current is passed through capacitor winding 42. Electrically nonconductive portion 62 has two metallization layers 64. Each metallization layer 64 includes a surface 66 which is perpendicular to the longitudinal direction of member 62.

The ends of electrically nonconductive member 62 are enclosed in metal shells 56a,b. Therefore electrically nonconductive center portion 62 thermally couples metal shells 56a,b while electrically separating them. Shells 56a,b receive leads 58a,b having heads 60a,b in which heads 60a,b secure leads 58a,b to shells 56a,b. When shells 56a,b are positioned over the opposite ends of electrically nonconductive member 62, perpendicular surfaces 66 of metallization layers 64 are soldered to the rims of shells 56a,b to form core assembly 55. Core assembly 55 is assembled prior to the wrapping of capacitor winding 42.

Member 62, having high thermal conductivity, may conduct thermal energy from the interior of capacitor 10a to shells 56a,b which extend substantially beyond terminals 54a,b and substantially beyond cover seals 48a,b and thereby may radiate thermal energy from the inteior of capacitor 10a to the exterior of capacitor 10a increasing the current carrying capacity of capacitor 10a. Cover seals 48a,b absorb thermal energy from capacitor winding 42 of capacitor 10a and radiate this thermal energy to the exterior of capacitor 10a and to shells 56a,b which radiate this thermal energy to the exterior of capacitor 10a.

Figure 8:
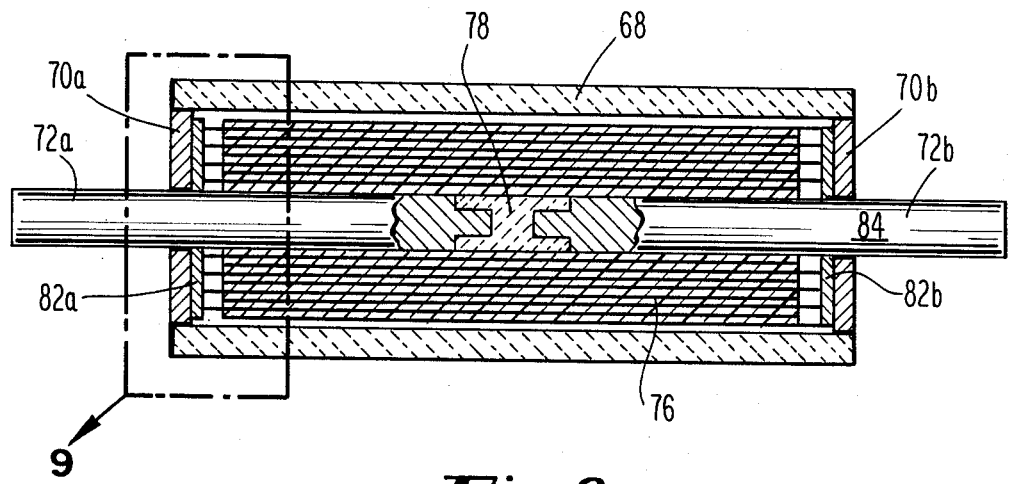
FIG. 8 shows a cross-sectional view of the capacitor of FIG. 6.

Referring now to FIGS. 6–8, there is shown capacitor 10b, an additional alternate embodiment of capacitor 10. Capacitor 10b includes capacitor winding 76 having electrodes 82a,b at opposite ends wrapped around core assembly 84. Core assembly 84 includes metal rods 72a,b which are matably received by slotted electrically nonconductive center portion 78. Electrodes 82a,b are formed at opposite ends of winding 76 in conventional manner as previously described. The capacitor element formed thereby is inserted into sleeve 68 and may be hermetically sealed by cover seals 70a,b.

Figure 9:
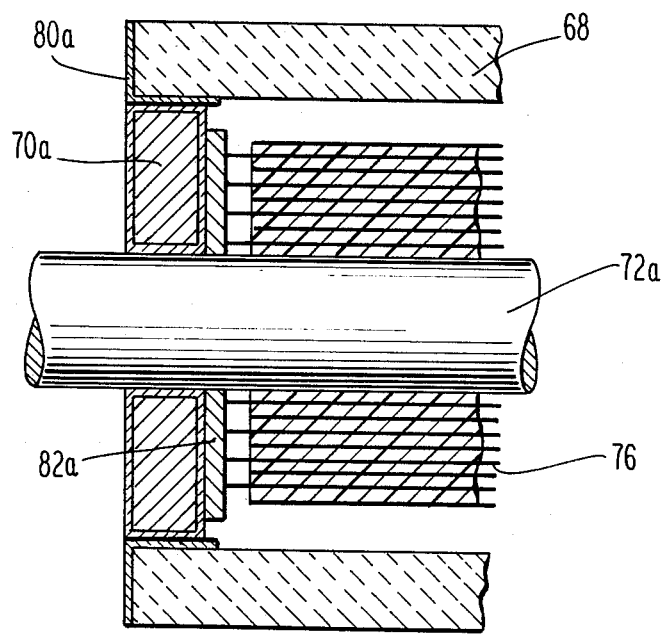
FIG. 9 shows an expanded view of a section of the capacitor of FIG. 8.

To seal capacitor 10b metal rod 72 is passed through opening 74a of cover seal 70a and metal rod 72b is passed through opening 74b of cover seal 70b. As further shown in FIG. 9, cover seals 70a,b are pressed firmly against electrodes 82a,b. Metallization layers 80a,b surround the outer circumferences of cover seals 70a,b and are soldered to the outer surfaces of cover seals 74a,b. The inner circumferences of cover seal 70a,b surrounding rods 72a,b are soldered to rods 72a,b respectively, thereby producing terminals 72a,b and hermetically sealing capacitor 10b.

The high thermal conductivity of center portion 78 and rods 72a,b causes thermal energy produced in capacitor winding 76 to be conducted to the exterior of capacitor 10b and radiated from the ends of rods 72a,b which extend substantially beyond cover seals 70a,b. Thermal energy absorbed from capacitor winding 76 through electrodes 82a,b by cover seals 70a,b may be conducted to rods 72a,b as well as radiated to the exterior of capacitor 10b by cover seals 70a,b. Rods 72a,b are effective to efficiently radiate thermal energy from the interior of capacitor 10b to the exterior of capacitor 10b and to conduct thermal energy through leads (not shown) to a printed circuit board (not shown).

Referring now to FIGS. 10A-C, there are shown three alternate embodiments of core assembly 84. Core assembly 84a includes metal rods 72c,d and electrically nonconductive center portion 78a. Metal rods 72c,d are slotted to matably receive center portion 78a. The ends of core assembly 84a are formed into threaded male sections 86 or threaded members 86.

Core assembly 84b includes metal rods 72e,f joined together by electrically nonconductive center portion 78a. Metal rod 72e includes male threaded sections or members 86. Metal rod 72f includes female threaded section 88. Core assembly 84c includes metal rods 72g,h connected by electrically nonconductive center portion 78a. Metal rod portions 72g,h both include female threaded sections 88. Female threaded sections 88 may be knurled to more effectively grip sealing epoxy if capacitor 10b is not hermetically sealed.

A core assembly of capacitor 10b may therefore include two male sections 86, a male section 86 and a female section 88, or two female sections 88. Thus a capacitor 10b may be attached to another capacitor 10b by screwing a male section 86 into a female section 88 thereby achieving both mechanical and electrical coupling between capacitors 10b. Additionally, male section 86 and female section 88 may be used to electrically couple a lead wire to capacitor 10b in which male section 86 may be threadably received by a female member such as a nut and female section 88 may threadably receive a male member such as a bolt. Core assemblies 84a,b,c are wrapped with capacitor winding 76 and inserted into sleeve 68 as previously described for core assembly 84.

I claim:

1. A capacitor having a substantially high value thermal energy transfer comprising:
    a hollow core assembly extending the entire length of the capacitor, the core assembly having a continuous passageway through its entire length for transferring thermal energy from the interior of the capacitor to the exterior,
    a capacitor winding wrapped around the core assembly having first and second electrodes,
    the core assembly including thermally coupled first and second metal portions electrically separated from each other and electrically coupled respectively to the first and second electrodes and forming the first and second terminals of the capacitor.

2. The capacitor of claim 1 in which the first and second metal portions are secured to an electrically nonconductive portion.

3. The capacitor of claim 2 in which the electrically nonconductive portion of the core assembly is formed of ceramic.

4. The capacitor of claim 1 further including first and second cover seals positioned in contact with the first and second terminals respectively, each cover seal having an opening for passage of the core assembly therethrough in which the ends of the core assembly extend outwardly substantially beyond the first and second cover seals.

5. The capacitor of claim 4 in which there is further provided a sleeve having first and second metallization layers entirely surrounding and secured to outer circumferences of the first and second cover seals respectively, the inner circumferences of the first and second cover seals being secured to the first and second metal portions thereby hermetically sealing the capacitor.

6. The capacitor of claim 1 in which each of the first and second metal portions includes a threaded section and a nut adapted for forcing the first and second cover seals inwardly against the first and second electrodes respectively.

7. The capacitor of claim 1 in which the metal portions are thermally coupled to a printed circuit board for transferring thermal energy from the capacitor to the printed circuit board.

8. A method for producing a wound capacitor having a substantially high thermal energy transfer comprising the steps of:
    forming a hollow core assembly having substantially high thermal conductivity extending the entire length of the capacitor wherein the core assembly is provided with a continuous passageway through its entire length for transferring thermal energy from the interior of the capacitor to the exterior,
    winding metallized film around the core assembly and forming first and second electrodes at opposite ends of the winding, and
    positioning the first and second cover seals in contact with the first and second electrodes respectively, and electrically coupling the first and second seals to the first and second electrodes respectively.

9. A wound capacitor having substantially high value thermal energy transfer comprising:
    a hollow core assembly having substantially high thermal energy conductivity from end to end and extending the entire length of the capacitor wherein the core assembly is provided with a continuous passageway through its entire length for transferring thermal energy from the interior of the capacitor to the exterior, and
    a capacitor winding wrapped around the core assembly and having first and second electrodes at opposite ends, the ends of the core assembly extending outwardly substantially beyond the first and second electrodes.

10. The capacitor of claim 9 in which the core assembly includes first and second separate metal portions.

11. The capacitor of claim 10 in which the first and second separate metal portions are secured to an electrically nonconductive portion.

12. The capacitor of claim 11 further including first and second cover seals positioned in contact with the first and second electrodes respectively, each cover seal having an opening for passage of the core assembly therethrough in which the ends of the core assembly extend outwardly substantially beyond the first and second cover seals.

13. The capacitor of claim 12 in which there is further provided a sleeve having first and second metallization layers entirely surrounding and secured to outer circumferences of the first and second cover seals respectively, the inner circumferences of the first and second seals being secured to the first and second metal portions thereby hermetically sealing the capacitor.

14. The capacitor of claim 12 in which each of the first and second metal portions includes a threaded section and a nut adapted for forcing the first and second cover seals inwardly against the first and second electrodes respectively.

15. The capacitor of claim 12 in which the first and second cover seals include perforations for receiving solder, the solder making electrical contact between the first electrode and the first cover seal and between the second electrode and the second cover seal.

16. The capacitor of claim 11 in which the first and second metal portions are hermetically sealed to the electrically nonconductive center portion.

17. The capacitor of claim 11 in which the electrically nonconductive portion of the core assembly is formed of ceramic.

18. The capacitor of claim 11 in which the first and second metal portions are matably joined to the electrically nonconductive portion.

19. The capacitor of claim 18 in which at least one metal portion includes a threaded male section for being received by a threaded female member.

20. The capacitor of claim 11 in which at least one metal portion includes a female threaded section for receiving a threaded male member.

21. A hermetically sealed wound capacitor having substantially high thermal energy transfer comprising:
- a hollow core assembly having first and second separate metal portions, the core assembly having a continuous passageway through its entire length,
- a capacitor winding wrapped around the core assembly and having first and second electrodes at opposite ends,
- a sleeve surrounding the capacitor winding, and
- first and second cover seals each having an inner circumference and an outer circumference positioned in contact with the first and second electrodes respectively, the entire outer circumferences of the first and second seals secured to the sleeve and the entire inner circumferences of the first and second cover seals secured to the first and second metal portions respectively thereby hermetically sealing the capacitor.

22. The hermetically sealed capacitor of claim 21 in which the first and second separate metal portions are secured to an electrically nonconductive portion.

23. The capacitor of claim 22 in which the electrically nonconductive center portion is formed of ceramic.

24. A capacitor having substantially high value thermal energy transfer comprising:
- a core assembly extending the entire length of the capacitor,
- a capacitor winding wrapped around the core assembly having first and second electrodes,
- the core assembly including first and second metal portions electrically coupled respectively to the first and second electrodes and forming the first and second terminals of the capacitor,
- thermally conductive means disposed at the center of the capacitor for absorbing thermal energy from the center of the capacitor, and
- both the first and second metal portions extending inwardly from at least the ends of the capacitor to substantially close to the center of the capacitor and electrically separated from each other by the thermally conductive means for absorbing thermal energy from the thermally conductive means and transferring the thermal energy to the exterior of the capacitor.

25. A capacitor having substantially high value thermal energy transfer comprising:
- a core assembly extending the entire length of the capacitor for transferring thermal energy from the interior of the capacitor to the exterior,
- a capacitor winding wrapped around the core assembly having first and second electrodes,
- the core assembly including first and second metal portions electrically coupled respectively to the first and second electrodes and forming the first and second terminals of the capacitor,
- first and second cover seals positioned in contact with the first and second terminals respectively, and
- means for electrically separating the first and second metal portions while thermally coupling the first and second metal portions.

26. A capacitor having substantially high value thermal energy transfer comprising:
- a hollow core assembly extending the entire length of the capacitor, the core assembly having a continuous passageway through its entire length for transferring thermal energy from the interior of the capacitor to the exterior,
- a capacitor winding wrapped around the core assembly, the core assembly including thermally coupled first and second metal portions electrically separated from each other and forming first and second terminals of the capacitor.

* * * * *